United States Patent
Owechko et al.

(10) Patent No.: US 7,558,762 B2
(45) Date of Patent: Jul. 7, 2009

(54) MULTI-VIEW COGNITIVE SWARM FOR OBJECT RECOGNITION AND 3D TRACKING

(75) Inventors: Yuri Owechko, Newbury Park, CA (US); Swarup Medasani, Thousand Oaks, CA (US); Payam Saisan, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 268 days.

(21) Appl. No.: 11/385,983

(22) Filed: Mar. 20, 2006

(65) Prior Publication Data

US 2007/0183669 A1   Aug. 9, 2007

Related U.S. Application Data

(63) Continuation-in-part of application No. 10/918,336, filed on Aug. 14, 2004.

(60) Provisional application No. 60/663,485, filed on Mar. 18, 2005.

(51) Int. Cl.
*G06E 1/00* (2006.01)
*G06E 3/00* (2006.01)
*G06G 7/00* (2006.01)
(52) U.S. Cl. .................. 706/14; D16/203; 396/427
(58) Field of Classification Search .................. 706/14
See application file for complete search history.

(56) References Cited

U.S. PATENT DOCUMENTS

2003/0142851 A1 * 7/2003 Brueckner et al. .......... 382/107

OTHER PUBLICATIONS

Eberhardt, Russel. Shi, Yuhui. "Particle Swarm Optimization: Developments, Applications, and Resources" IEEE, 2001, pp. 81-86.*
Murray, Don. LIttle, Jim; "Using real-time stereo vision for mobile robot navigation" Citeseer,. Autonomous Robots, vol. 8, No. 2, pp. 161-171. 2000.*
Z. Zhang, "A flexible new technique for camera calibration," IEEE Transactions on Pattern Analysis and Machine Intelligence, 22(11): 1330-1334, 2000.

(Continued)

*Primary Examiner*—David R Vincent
*Assistant Examiner*—Ben M Rifkin
(74) *Attorney, Agent, or Firm*—Tope-McKay & Associates

(57) ABSTRACT

An object recognition system is described that incorporates swarming classifiers. The swarming classifiers comprise a plurality of software agents configured to operate as a cooperative swarm to classify an object in a domain as seen from multiple view points. Each agent is a complete classifier and is assigned an initial velocity vector to explore a solution space for object solutions. Each agent is configured to perform an iteration, the iteration being a search in the solution space for a potential solution optima where each agent keeps track of its coordinates in multi-dimensional space that are associated with an observed best solution (pbest) that the agent has identified, and a global best solution (gbest) where the gbest is used to store the best location among all agents. Each velocity vector changes towards pbest and gbest, allowing the cooperative swarm to concentrate on the vicinity of the object and classify the object.

30 Claims, 11 Drawing Sheets

OTHER PUBLICATIONS

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling Human Motion for recognition," IS&T/SPIE 17th annual symposium, San Jose, CA 2005.

Y. Owechko, et al., "Vision-Based occupant sensing and recognition for intelligent airbag systems," submitted to IEEE Trans. On Intelligent Transportation Systems, 2003.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al.,"Planar shape recognition across multiple views," In Proceedings of the Interationa Conference on Pattern Recognition (ICPR)—2002, Quebec, Canada.

Sujit Kuthirummal, et al., "Multiview contraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

S. Hongeng, et al., "Video-based event recognition: activity representation and probabilistic recognition methods," CVIU, 96, 129-162, 2004.

S. Medasani, et al., "Graph matching by relaxation of fuzzy assignments,"IEEE Transactions on Fuzzy Systems, 9(1), 173-183, Feb. 2001.

R. Krishnapuram, et al., "Content-based image retrieval based on a fuzzy approach," IEEE Transactions on Knowledge and Data Engineering (TKDE), Oct. 2004.

N. Oliver and A. Pentland, "Graphical models for driver behavior recognition in a smart car," Proc. Of IV2000.

K. Sato and J.K. Aggarwal, "Temporal spatio-velocity transform and its application to tracking and interaction," CVIU 96 (2004), 100-128.

G. Medioni, I. Cohen, F. Brenmond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22 (8), Aug. 2000.

N. Oliver, B. Rosario, and A. Pentland, "A Bayesian computer vision system for moceling human interactions," IEEE-PAMI, 22(8), Aug. 2000.

J.C. Bezdek, Pattern Recognition with Fuzzy Objective Function Algorithms, Plenum Press, New York, 1981.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences, Tsinghua University Press, pp. 19-24. Beijing, China, Apr. 26-31, 1999.

D.L. Swets, et al., "Genetics Algorithms for Object Recognition in a complex scene," Proc. Of Intl. Conference on Image Processing, vol. 2, Oct., pp. 23-26, 1995.

Kennedy, J., et al., "Swarm intelligence," San Francisco: Morgan Kaufmann Publishers, 2001.

R.C. Eberhart, et al., "Particle swarm optimization: Developments, applications, and resources," Proceedings of IEEE Congress on Evolutionary Computation (CEC 2001), Korea, 2001.

R. Brits, et al., "A Niching Particle Swarm Optimizer," 2002.

F. Rojas, I. Rojas, R. M. Clemente, and C.G. Puntoner, "Nonlinear blind source separation using genetic algorithms," in Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantative Analysis of Properties and Spatial Relations of Fuzzy Image Regions," Transactions on Fuzzy Systems, 1(2):98-110, 1993.

Y. Owechko, S. Medasani, and N. Srinivasa, "Classifier Swarms for Human Detection in infrared imagery," Proc. Of the CVPR workshop on Object Tracking and Classification Beyond the Visible Spectrum (OTCBVS'04) 2004.

B. Bhanu, et al., "Adaptive Image Segmentation Using a Genetic Algorithm," IEEE Transactions on Sytems, Man, and Cybernetics, vol. 25, No. 12, Dec. 1995.

Y. Owechko and S. Medasani, "A Swarm-based Volition/Attention Framework for Object Recognition," IEEE Conference on Computer Vision and Pattern Recognition, San Diego, Proc. Of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. On Evol. Computation on Particle Swarm Optimization, vol. 8, No. 3, Jun. 2004.

K.E. Parsopoulos, et al. "On the Computation of All Global Minimizers Through Particle Swarm Optimization," Special issue of IEEE Trans. On Evol. Computation on Particle Swarm Optimization, vol. 8, No. 3, Jun. 2004.

F. van der Bergh, et al., "A Cooperative Approach to Particle Swarm Optimization," Special issue of IEEE Trans. On Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. On Evol. Computation on Particle Swarm Optimization, vol. 8, No. 3, Jun. 2004.

C.A. Coello, "Handling Multiple Objectives With Particle Swarm Optimization," Special issue of IEEE Trans. On Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. On Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. On Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

* cited by examiner

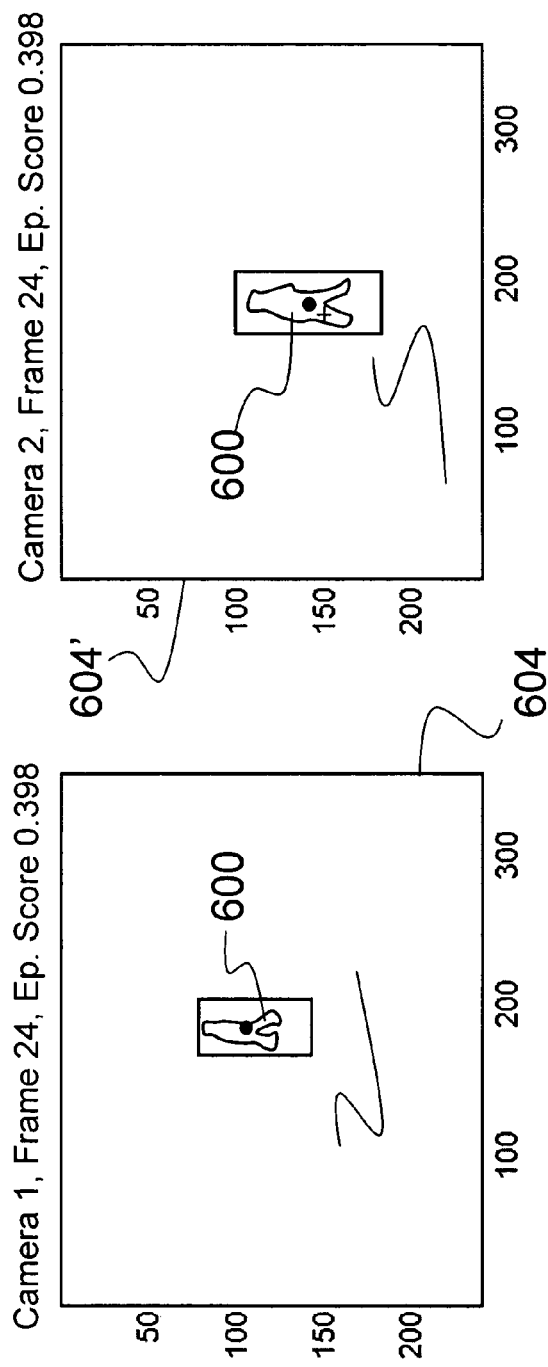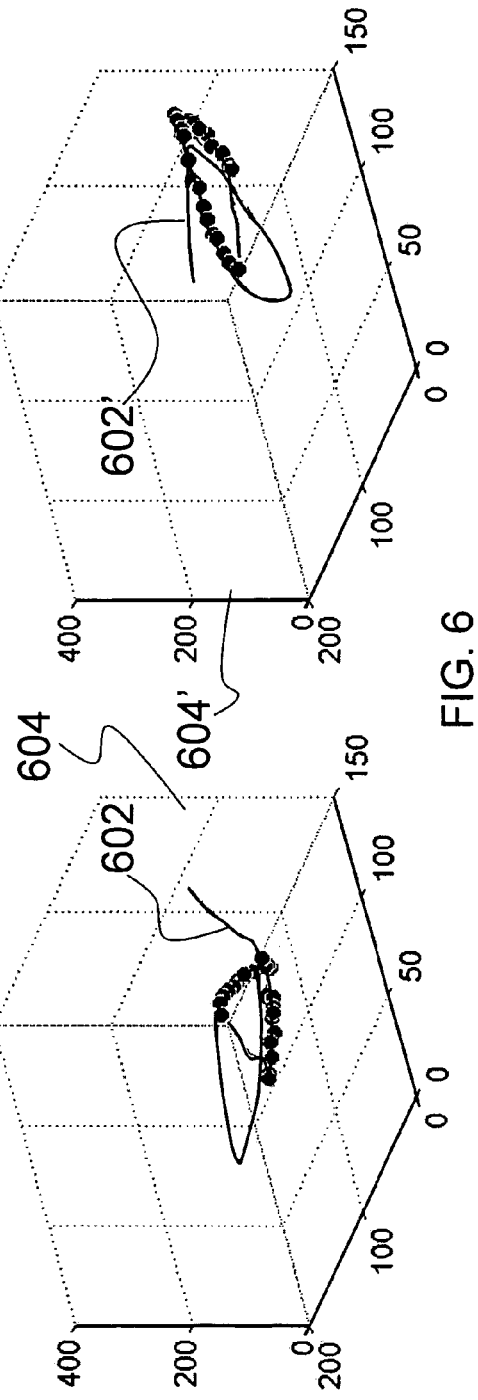
FIG. 6

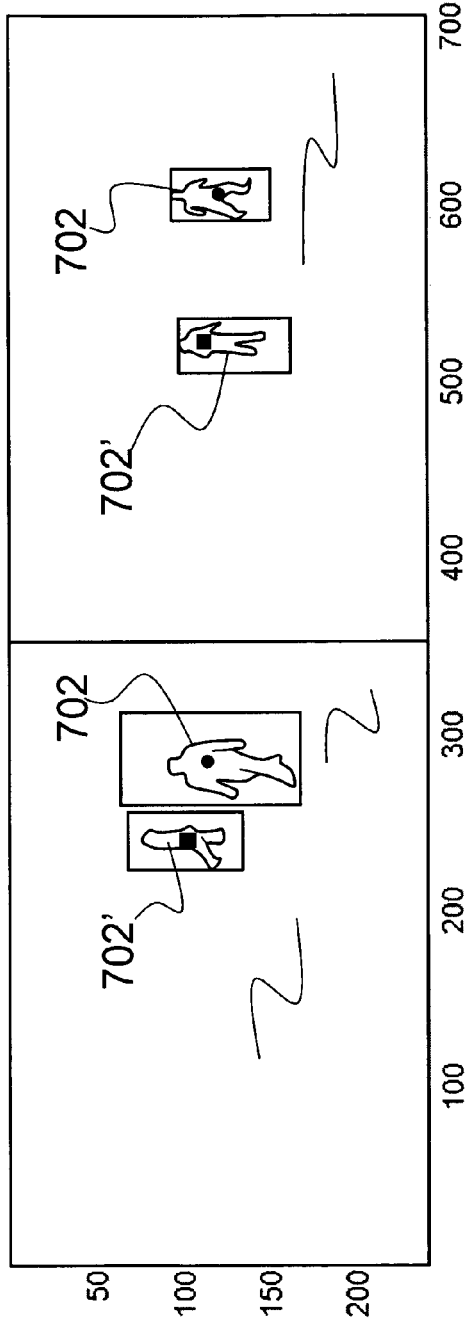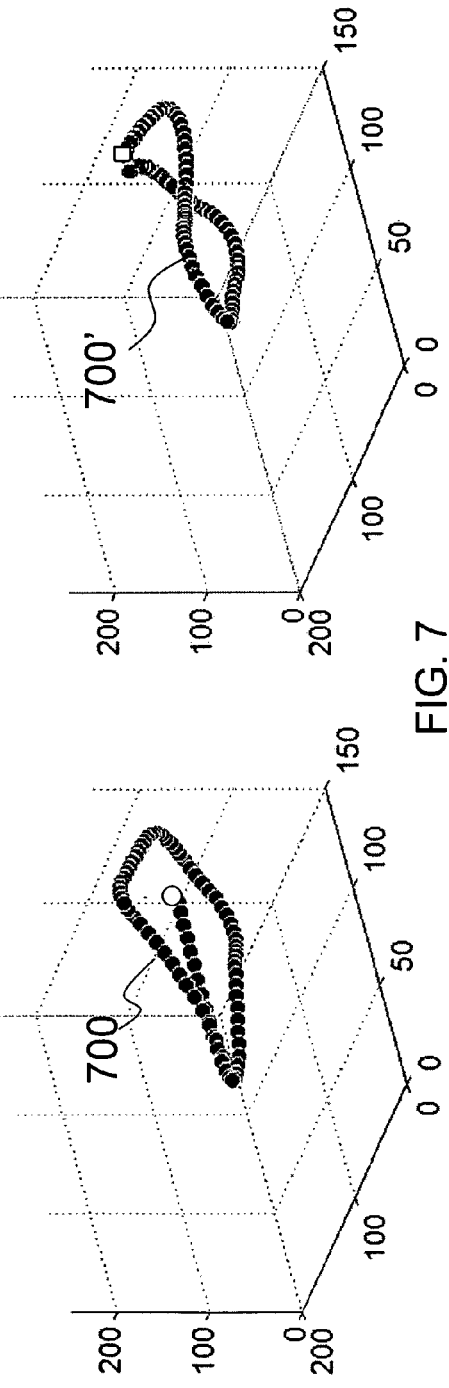
FIG. 7

MULTI-VIEW COGNITIVE SWARM FOR OBJECT RECOGNITION AND 3D TRACKING

PRIORITY CLAIM

This patent application is a Continuation-in-Part application, claiming the benefit of priority of U.S. Provisional Application No. 60/663,485, filed on Mar. 18, 2005, entitled, "Multi-view Cognitive Swarm for Object Recognition and 3D Tracking," and also claiming the benefit of prior to U.S. Non-Provisional patent application Ser. No. 10/918,336, filed on Aug. 14, 2004, entitled, "Object Recognition Using Swarming Image Classifiers."

BACKGROUND OF INVENTION (1) Field of Invention

The present invention relates to an object recognition and tracking system, and more particularly, to an object recognition and tracking system that utilizes the geometric structure between image pairs corresponding to different views of three-dimensional (3D) objects to identify and track objects in 3D world coordinates.

(2) Related Art

Typically, classification of objects in an image is performed using features extracted from an analysis window which is scanned across the image. In the prior art, identification/classification from a single view is combined with motion parallax (stereo geometry) in order to recognize geometrical parameters of objects. The result is often used to generate three-dimensional (3D) models of architectural buildings. Essentially, existing methods allow the inference of 3D shape and texture where evidence from a single two-dimensional (2D) image is weak. The methods are formulated for 3D objects with highly salient linear geometric features, such as rectangular frames, corners, and square grids. Therefore, existing methods cannot be applied directly to deformable 3D objects with nebulous 2D projections, such as those of pedestrians.

Other existing systems construct an image-based visual-hull from a number of monocular views of both faces and gaits at different viewing configurations (pedestrians). If a forward viewing position is captured, the face of the pedestrian is made available to frontal face classifier which identifies the pedestrian. Alternatively, if the side view is available, the gait information is used to identify the pedestrian. This particular invention shows improved results, demonstrating how different views of a pedestrian can be combined via two different types of classifiers (face and gait), exploiting the strengths of each corresponding classifier at different viewing configurations. Although the method is interesting, it cannot be used with a single-mode classifier. It also does not exploit the constraints of multi-view geometry.

Another existing system uses a number of multi-view geometric constraints for collections of geometric primitives, such as planar shape boundaries. This is a theoretically elegant work, where several view-independent algebraic constraints are derived that are useful for matching and recognizing planar boundaries across multiple views. However, the methods are too low-level to be embedded in a multi-view classifier architecture and cannot be effectively applied to constraining and fusing the output from single-view classifiers.

Another reference describes the performance gain available by combining results of a single view object recognition system applied to imagery obtained from multiple fixed cameras. However, the system is focused on classification results for 3D objects with highly articulate geometric features (toy cars, planes, cups, etc.) that lead to drastically different appearances when viewed from different viewing angles. The reference describes performance variation in the presence of clutter and changing camera parameters. The reference concludes by suggesting that limitations exist for enhancing performance of classifiers whose single-view performance is weak to begin with. In the context of pedestrian classification, the results are not relevant.

Thus, a continuing need exists for an object recognition system using multi-view constraints and being formulated to restrict the search space by combining shape priors to reduce false alarms and speed up the process.

SUMMARY OF INVENTION

The present invention relates to a multi-view object recognition system incorporating swarming domain classifiers. The system comprises a processor having a plurality of software agents configured to operate as a cooperative swarm to classify an object in a domain as seen from multiple view points. Each agent is a complete classifier and is assigned an initial velocity vector to explore a solution space for object solutions. Each agent is also configured to perform at least one iteration. The iteration is a search in the solution space for a potential solution optima where each agent keeps track of its coordinates in multi-dimensional space that are associated with an observed best solution (pbest) that the agent has identified, and a global best solution (gbest). The gbest is used to store the best location among all agents, with each velocity vector thereafter changing towards pbest and gbest, thereby allowing the cooperative swarm to concentrate on the vicinity of the object and classify the object when a classification level exceeds a preset threshold.

In another aspect, the agents are configured to search for the object in three-dimensional (3D) spatial coordinates, such that the object is a 3D object and the 3D object has distinct appearances from each view point in the multiple view points.

In yet another aspect, the distinct appearances of the 3D object from the multiple view points are linked by agents searching for the 3D object in the spatial coordinates, such that each agent has an associated 3D location X and an object height h. Each of the multiple view points is provided as a 2D image from a calibrated camera having a given geometry, such that given the known geometry of the calibrated cameras, a 2D location, $[x,y]^T = \pi(X)$, of an agent's projection in each view (2D image) is calculated. In the above notation, superscript T denotes transpose. The 2D location is used to select an image window that is sent to a classifier having a classifier output that corresponds to the classifier's confidence that the image window contains the object.

In another aspect, each agent has a search trajectory that is guided by a cost function, such that the cost function is formed by combining the classifier outputs evaluated at the agent's projection points in each of the views, wherein the projection points are points in an image corresponding to the 3D object.

In yet another aspect, for an agent at 3D location $X=[x,y,z]^T$, a value of the cost function is calculated according to the following:

$$f(X,h) = w_1 * \text{classifier}(\text{image}_1, \pi_1(X), \Pi_1(X,h)) + w_2 * \text{classifier}(\text{image}_2, \pi_2(X), \Pi_2(X,h))$$

where, $\pi: \mathbb{R}^3 \to \mathbb{R}^2$ is a projection operator such that $\pi_n$ maps the object's 3D location X into a 2D location [x,y] in image n. Additionally, $w_1 + w_2 = 1$, where $w_1$ and $w_2$ are positive weighting factors and normally $w_1 = w_2 = 0.5$. Furthermore, $\Pi$ is a projection operator for object height, h, such that the projection operator $\Pi_n$ maps the 3D object height to its corresponding projection size in image n. Classifer denotes a confidence output of the object classifier operating on the window in image n with location $\pi_n(X)$ and window size $\Pi_n(X,h)$. Finally, * denotes multiplication.

In yet another aspect, each of the multiple view points is provided as a 2D image from calibrated stereo cameras. The multiple view points include at least two 2D views, view 1 and view 2, wherein each view has 2D spatial coordinates. The agents are configured to move within each view independently to localize the object in each view independently.

In another aspect, the object is a 3D object having 3D spatial coordinates. Additionally, the 3D object has a 2D projection in each view in the multiple view points such that the object has a distinct appearance in each view, and wherein the agents are configured to search for the object in the 2D spatial coordinates.

In yet another aspect, each of the 2D views is connected through geometric constraints of the calibrated stereo cameras. Furthermore, the agents are further configured to operate as two distinct sets of agents such that each set searches for the object in a view independently to locate a 2D location [x,y] and a 2D image window height ĥ of the object in each view. Using triangulation, the 2D locations from each view are combined to estimate the object's 3D spatial coordinates from the 2D projections.

In yet another aspect, the system is further configured to recognize multiple objects in the domain, such that when there is more than one object in the domain, the system is further configured to establish a correspondence between the 2D locations found in each 2D view to identify inter-view pairs.

When establishing a correspondence between the 2D locations found in each 2D view, the system is further configured to form a cost/distance matrix for all possible inter-view pairs of identified object locations. The cost/distance matrix is a pair-wise cost ($Cost_{ij}$) function, calculated as follows:

$$\mathrm{Cost}(i, j) = \lambda_1 |x_2^T F x_1| + \lambda_2 \left( \frac{|\hat{h}_1 - h_1|}{h_1} + \frac{|\hat{h}_2 - h_2|}{h_2} \right) + \lambda_3 \left( \sum_w \|I_1(x, y) - I_2(x, y)\|^2 \right)$$

where Cost denotes a cost function, minimization of which ensures a consistent localization of an object in the 3D spatial coordinates;

i and j denote point i in view 1 and point j in view 2 that correspond to detected objects in the two views;

$\lambda_1$ denotes weighting factor for an epipolar constraint portion of the cost function;

$x_2$ denotes a coordinate vector for an object in view 2;

F denotes a fundamental matrix that determines epipolar lines in one view corresponding to points in the other view;

$x_1$ denotes a coordinate vector for an object in view 1;

superscript T denotes a transpose of the vector $x_2$;

wherein $x_1$ is a column vector and F is a matrix, so $Fx_1$ is also a column vector;

$\lambda_2$ denotes a weighting factor for a window size consistency portion of the cost function;

$h_1$ denotes a size of the object in view 1 determined from the 2D projection of the object in 3D spatial coordinates to 2D view 1;

ĥ denotes the size of the object in view 1 or 2 as determined from the object classifier outputs;

$h_2$ denotes the size of an object in view 2 determined from the 2D projection of the object in 3D spatial coordinates to the 2D view 2;

$\lambda_3$ denotes a weighting factor for a window appearance similarity portion of the cost function;

w denotes window index;

∥ denotes a magnitude operator;

$I_1$ denotes an intensity distribution of the window in view 1;

x denotes an x coordinate in either view;

y denotes a y coordinate in either view;

$I_2$ denotes an intensity distribution of the window in view 2; and $\sum$ denotes summation.

In another aspect, the system is further configured to optimize pairing between the inter-view points (point i in view 1 and point j in view 2) using a bipartite weighted matching problem, and further comprising a smoothing filter for optimal 3D trajectory estimation.

In yet another aspect, the object is further configured to track multiple objects.

Finally, as can be appreciated by one in the art, the present invention also includes a method and computer program product for carrying out the operations of the invention described herein.

BRIEF DESCRIPTION OF THE DRAWINGS

The objects, features, and advantages of the present invention will be apparent from the following detailed descriptions of the various aspects of the invention in conjunction with reference to the following drawings, where:

FIG. 6 is an illustration of exemplary single pedestrian tracking, where 3D trajectories correspond to distinct camera views;

FIG. 7 is an illustration of exemplary multiple pedestrian tracking, where 3D trajectories correspond to distinct pedestrians as seen from the same camera;

DETAILED DESCRIPTION

Figure 1:
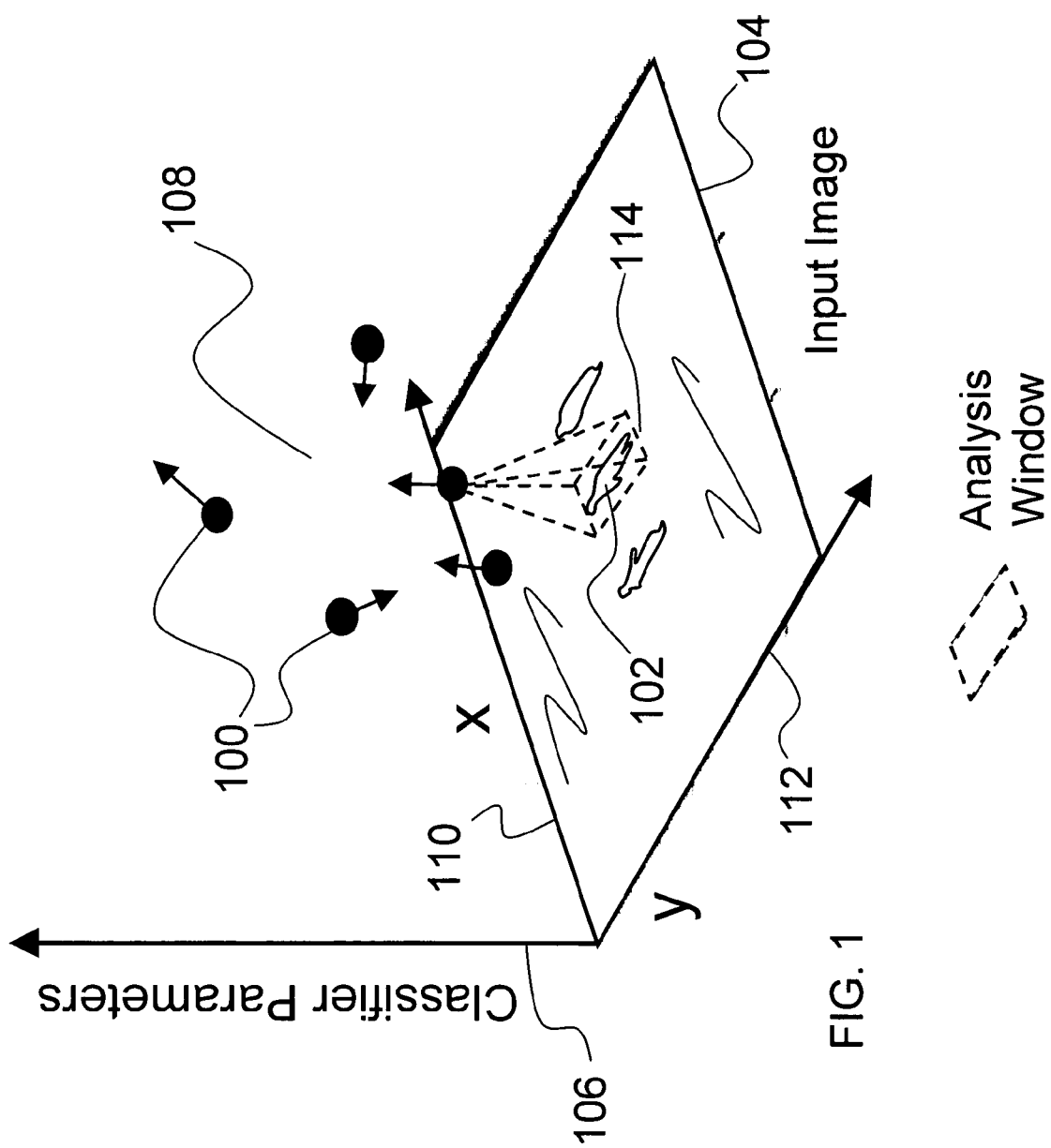
FIG. 1 is an illustration of an exemplary object recognition using a cognitive swarm of classifier agents.

The present invention relates to an object recognition and tracking system, and more particularly, to an object recognition and tracking system that utilizes the geometric structure between image pairs corresponding to different views of three-dimensional (3D) objects to identify and track objects in 3D world coordinates. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. Additionally, the process for object recognition using swarming image classifiers draws material from the process shown and described in U.S. patent application Ser. No. 10/918,336, whose entire disclosure is hereby incorporated by this reference as though fully set forth herein. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is presented. Next, a description of various principal aspects of the present invention is provided. Third, an introduction is provided to give the reader a general understanding of the present invention. Finally, a description of various aspects of the present invention is provided to give an understanding of the specific details.

(1) Glossary

Before describing the specific details of the present invention, a glossary is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Domain—The term "domain" refers to any searchable dimension in the solution space, non-limiting examples of which include spatial coordinates, scale, frequency, time, Doppler shift, time delay, wave length, and phase. Domain is often attributed to the special coordinates in an image.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

Large Core—The term "large core" refers to a relatively large volume in the solution space in which all points have classification confidence values above a given threshold. Objects tend to generate large cores.

PPSO—The term "PPSO" refers to a possibilistic particle swarm optimization algorithm that allows different groups of software agents (i.e., particles) to work together with different temporary search goals that change in different phases of the algorithm.

PSO—The term "PSO" refers to a particle swarm optimization (PSO) algorithm that searches a multi-dimensional solution space using a population of software agents (i.e., particles) in which each agent has its own velocity vector. The success of each agent in finding good solutions has an influence on the dynamics of other members of the swarm.

Sequential Niching—The term "sequential niching" refers to a method for searching a domain, where once the software agents identify and classify an object in the domain, the object is erased from the domain so that the swarm can continue searching the domain for additional objects without being distracted by the previously identified object.

Small Core—The term "small core" refers to a relatively small volume in the solution space in which all points have classification confidence values above a given threshold. Non-object false alarms tend to generate small cores.

Software Agent—The term "software agent" refers to a self-contained computer program that operates autonomously, although its behavior may be affected by the actions of other agents. The term "software agent" or "agent" is also to be used interchangeably with the word "particle."

Window—The term "window" refers to an analysis window determined by each agent's location in the image spatial coordinates and scale coordinates. The analysis window is the image region processed by the agent to determine if an object is located there.

(2) Principal Aspects

The present invention has three "principal" aspects. The first is an object recognition system using swarming domain classifiers, typically in the form of software and/or manual operations, operated using a data processing system (e.g., computer). When in the form of software, it is typically in the form of software modules configured to perform the operations described herein. The second principal aspect is a method for object recognition, the method operating using a computer system. The third principal aspect is a computer program product. The computer program product generally represents computer-readable instructions (e.g., source or object code) stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read only memory (ROM), and flash-type memories. These aspects will be described in more detail below.

(3) Introduction

Two-dimensional (2D) image-based classifier/recognition technology has evolved rapidly in recent years, integrating new fronts in statistical decision theory, computer vision, and system theory. While good classifiers have been developed, they remain limited in speed and functionality. In particular, existing 2D classifiers can search and localize objects in 2D images only. Currently, there is no working system that integrates 2D classifier technology with multi-view three-dimensional (3D) vision technology. Integration of these two technologies poses a unique opportunity to solve problems not practical with either method alone. For example, such integration extends object recognition and localization tasks to 3D without resorting to alternate 3D range sensing modalities (such as 2D imagery only). Additionally, multi-view 3D localization without background subtraction or flow estimations can be realized. Further benefits include an increased accuracy/robustness for 2D classifiers; acceleration of the classifier-based search process by exploiting the geometric structure of the problem; introduction of additional constraints to reduce false alarms; and exploration of new classes of problems/solutions in the joint domain.

A related application, U.S. patent application Ser. No. 10/918,336, entitled, "Object Recognition System Incorporating Swarming Domain Classifiers," describes a method using "cognitive swarms" for visual recognition of objects in an image. The cognitive swarms combine feature-based object classification with efficient search mechanisms based on swarm intelligence. Cognitive swarms comprise groups of object classifier agents that both cooperate and compete to find objects, such as pedestrians or vehicles, in video data using particle swarm optimization (PSO). As described in the previous application, a single large swarm detects and recognizes objects in images very efficiently.

The present invention expands on the cognitive swarm idea by adding a framework that enables single-view, image-based classifier systems to utilize widely separated multi-view imagery. Thus, the framework addresses problems that are impractical to solve using single-view approaches. The present invention is an object recognition and tracking system that utilizes the geometric structure between image pairs that correspond to different views of 3D objects. By using multi-view imagery, the system improves accuracy, reduces false alarms, and tracks objects in 3D world coordinates. This is a novel development that merges object recognition with multi-view vision technology to expand the performance of object classifier and tracking systems. The framework increases accuracy and reduces false alarms by fusing evidence from the multiple views. The evidence is fused using epipolar geometric constraints on the possible consistent locations of objects in the multiple views. In addition, through camera calibration, the recognized objects can be spatially localized and tracked in 3D world coordinates.

The present invention provides several advantages over the prior art. For example, most existing approaches assume fixed calibrated cameras or single objects in the view. Additionally, the 3D swarm particles are advantageous because of their speed in localizing objects in the world 3D space. Also, each 3D particle in the swarm provides a latent linkage between corresponding regions in views from which the particle is visible. As a result of the latent linkage, the performance of the single view classifier across different views can be fused using uncertainty handling methods for enhanced robustness.

A goal of the present invention is to use the results of a 2D cognitive swarm classifier in combination with 3D multiple view geometry algorithms. The present invention has achieved this objective, thereby improving the performance and speed of the classification using multiple views, while constructing a system capable of localizing classified objects in 3D from 2D imagery.

The multi-view recognition and 3D tracking system described herein has many broad applications. For example, the present invention can be applied to automotive safety, automatic target recognition, and surveillance of both interior and exterior spaces. Surveillance applications include both security applications as well as factory monitoring for safety and efficiency applications. For example, the system enables reliable detection and 3D tracking of humans on a factory floor and allows more efficient and flexible use of factory floor space by eliminating existing cumbersome sensor systems. Additionally, many commercial applications exist in security, safety, and efficiency enhancement.

(4) Description

To provide the reader with a clear understanding of the present invention, a summary is provided of the cognitive swarm for object recognition that was described in the previous application, U.S. patent application Ser. No. 10/918,336. Next, described is the multi-view cognitive swarm for object recognition and three-dimensional (3D) tracking according to the present invention.

(4.1) Cognitive Swarm Method for Object Recognition

The Applicants of the present invention previously filed U.S. patent application Ser. No. 10/918,336, entitled, "Object Recognition System Incorporating Swarming Domain Classifiers." application Ser. No. 10/918,336 is incorporated by reference as though fully set forth herein. The application describes the use of cognitive swarms for object recognition. Cognitive swarms combine feature-based object classification with efficient search mechanisms based on particle swarm optimization (PSO). Objects in a visual scene need to be located and classified so they can be tracked effectively for automotive safety, surveillance, perimeter protection, and a variety of other government, and commercial applications.

Typically, classification of objects in an image is performed using features extracted from an analysis window which is scanned across the image. This brute force search can be very computationally intensive, especially if a small window is used since a classification must be performed at each window position. Conventional approaches to reducing the computational load are based on reducing the search space by using another sensor, such as scanning radar to cue the vision system and measure the range of the object. Limitations of the radar approach include high cost, false alarms, the need to associate radar tracks with visual objects, and overall system complexity. Alternatively, previous vision-only approaches have utilized motion-based segmentation using background estimation methods to reduce the search space by generating areas of interest (AOI) around moving objects and/or using stereo vision to estimate range in order to reduce searching in scale.

This approach utilizes the particle swarm optimization algorithm, a population-based evolutionary algorithm, which is effective for optimization of a wide range of functions. The algorithm models the exploration of multi-dimensional solution space by a population of individuals where the success of each individual has an influence on the dynamics of other members of the swarm. One of the aspects of this approach is that two of the dimensions are used to locate objects in the image, while the rest of the dimensions are used to optimize the classifier and analysis window parameters.

PSO is a relatively simple optimization method that has its roots in artificial life in general, and to bird flocking and swarming theory in particular. Conceptually, it includes aspects of genetic algorithms and evolutionary programming. Each potential solution is assigned a randomized velocity vector and the potential solutions called "particles" then "fly" through the space in search of the function optima (these particles should not be confused with particle filters, which estimate probability distributions for tracking and localization applications). The particles are self-contained agents that classify local image windows as belonging to one of a set of classes.

Each particle keeps track of its coordinates in a multi-dimensional space that are associated with the best solution (pbest) it has observed so far. A global best parameter (gbest) is used to store the best location among all particles. The velocity of each particle is then changed towards pbest and gbest in a probabilistic way according to the following update equations:

$$v^i(t)=wv^i(t-1)+c_1*rand()*(pbest-x^i(t-1))+ c_2*rand()*(gbest-x^i(t-1))$$

$$x^i(t)=x^i(t-1)+v^i(t),$$

where $x^i(t)$ and $v^i(t)$ are the position and velocity vectors at time t of the i-th particle and $c_1$ and $c_2$ are parameters that weight the influence of their respective terms in the velocity update equation, and * denotes multiplication. w is a decay constant which allows the swarm to converge to a solution more quickly. The rand() function generates a random number between 0 and 1 with a uniform distribution.

The above dynamics reflect a socio-psychological model where individual particles change their beliefs in accordance with a combination of their own experience and the best experience of the group (this is in contrast to other models of cognition where an individual changes his/her beliefs to become more consistent with his/her own experience only). The random element introduces a source of noise which enables an initial random search of the solution space. The search then becomes more directed after a few iterations as the swarm starts to concentrate on more favorable regions.

This type of search is much more efficient than a brute force search or gradient-based search methods. It is similar to genetic algorithms in that it can be used for discontinuous and noisy solution spaces since it only requires an evaluation of the function to be optimized at each particle position, with no gradient information being used. Unlike the chromosome string representation of potential solutions used in genetic algorithms, the PSO particles do not undergo cross-over or mutation operations, they just travel to a different position, calculate the solution at that position, and compare it with their own and global previous best positions in order to update their velocity vectors.

The evolution of a good solutions is stable in PSO because of the way solutions are represented (e.g., small changes in the representation results in small changes in the solution, which result in improved convergence properties compared to genetic algorithms). PSO relies on the fact that in most practical problems, the optimum solution usually has better than average solutions (i.e., good solutions) residing in a volume around it. These good solutions tend to attract the particles to the region where the optimum lies. The swarm becomes more and more concentrated until the optimum is found (e.g., gbest no longer changes). PSO has been applied to a wide variety of optimization problems.

It has been found experimentally that the number of particles and iterations required scale weakly with the dimensionality of the solution space. The total number of function evaluations is very small compared to the size of the solution space, as was shown in the previous patent application. Although basic PSO only searches for a single optimum in the solution space, various approaches have been described for finding multiple local optima or "niches."

The basic cognitive swarm concept described in the previous application is shown in FIG. 1. As shown in FIG. 1, a swarm of classifier agents 100 (i.e., PSO particles), each of which is a self-contained image classifier, searches for objects 102 in a combined image 104/classifier parameter 106 solution space 108. Additionally, each agent 100 both competes and cooperates with other agents 100 using simple dynamics to find objects 102 in the scene by optimizing the classifier outputs. Furthermore, analysis and experimental results show that cognitive swarms can both improve the detection/false alarm operating point and improve update rates by orders of magnitude over conventional search methods.

The objective is to find multiple instances of an object class in an input image 104. The PSO particles 100 move in a solution space 108 where two of the dimensions represent the x coordinate 110 and the y coordinate 112 in the input image 104. The key concept in this approach is that each particle 100 in the PSO swarm is a self-contained object classifier which outputs a value representing the classification confidence that the image distribution in the analysis window 114 associated with that particle 100 is or is not a member of the object class. All particles 100 implement the same classifier, only the classifier parameters 106 vary as the particle 100 visits different positions in the solution space 108.

Two of the solution space dimensions represent the location of the analysis window 114 on the input image 104. A third dimension represents the size or scale of the analysis window 114 in order to match the unknown size of objects 102 in the image 104. Additional dimensions can be used to represent other classifier parameters such as, for example, the rotation angle of the object 102. The method described herein differs from other vision algorithms which use swarm intelligence in that the other methods use swarms to build up features using ant colony pheromone-based ideas.

In the method as used in the present invention, swarming occurs at the classifier level in a space consisting of object location, scale, and other classifier parameter dimensions, where each particle 100 is a complete classifier. The particles 100 swarm in this space 108 in order to find the local optima which correspond to objects in the image. The classifier details are not visible at the abstraction level of the swarm. One can imagine a multidimensional surface of classifier confidence (a type of saliency map) that can be generated if the classifier is scanned across all of the dimensions. The classifier confidence map for an image 104 can be discontinuous and noisy, with many isolated false alarms where the classifier responds incorrectly to patterns in the image. Thus, using gradient-based methods to find objects in an image is problematic, which is why an exhaustive search is usually used. By generating classifier confidence maps for many images, it has been found experimentally that objects 102 in the scene tend to have large "cores" of high confidence values. Many false alarms tend to be isolated with small cores. Since the probability of a particle landing in or near a core is greater for a larger core, the particles 100 are attracted more to larger cores and the number of false alarms in a image are reduced using PSO compared to exhaustive searching. In an exhaustive search, all of the false alarms in an image 104 will be detected so the classifier must be biased towards very low false alarm rates in order to keep the overall false alarm rate low, which also has the side effect of reducing the detection rate.

Figure 2:
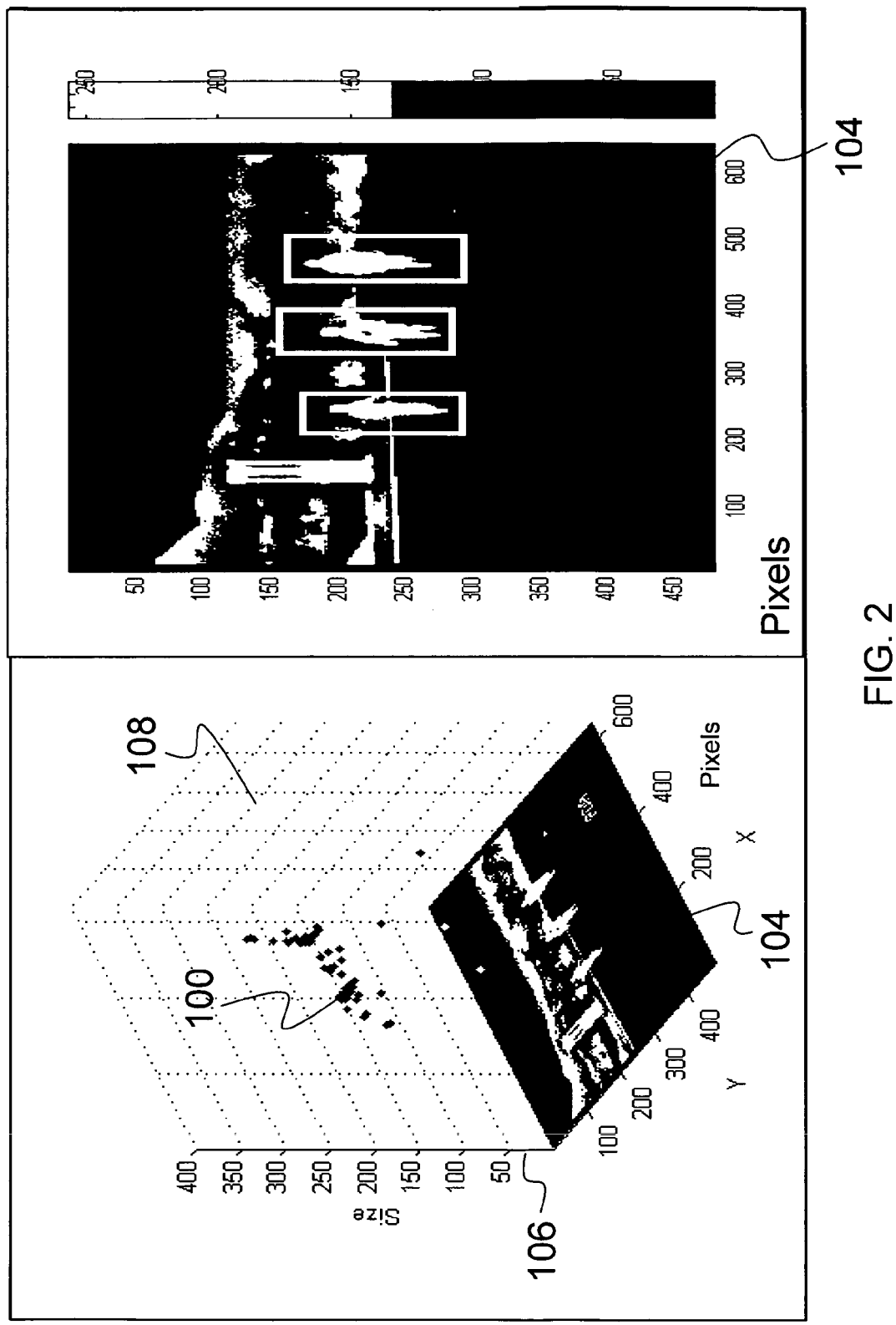
FIG. 2 is an illustration of exemplary multiple object recognition by a cognitive swarm, comprising pedestrian classifier agents using local image erasure.

In summary, the previous application described how a single large cognitive swarm can be used to recognize multiple objects in the scene through "sequential erasing" in which a detected object is erased with a Gaussian distribution before reinitializing the swarm to search for additional objects. The previous application also described a "probabilistic" clustering approach for detecting multiple objects. For illustrative purposes, exemplary results for detecting multiple objects using sequential erasure are shown in FIG. 2. As shown, the agents 100 are searching for actual objects in a combined image 104/classifier 106 parameter solution space 108.

Further information regarding cognitive swarms and PSO is available in the previous application, application Ser. No. 10/918,336.

(4.2) Multi-View Cognitive Swarm

The present invention describes a novel framework to enable single-view image-based classifier systems to utilize widely separated multi-view imagery and address problems that are impractical to solve using single view approaches. The present invention is an automatic object recognition and tracking system that utilizes the geometric structure between image pairs corresponding to different views of 3D objects. In addition, through camera calibration, the recognized objects can be spatially localized and tracked in 3D world coordinates.

The present invention includes several aspects. For example, the PSO is formulated for a multi-view framework. Additionally, the present invention allows for 3D localization and tracking of objects using 2D image pairs from widely separated viewpoints. Classifier robustness is also increased via reduction of false alarms. False alarms are reduced by imposing 3D geometric (epipolar) constraints on positive detections, and by facilitating the use of 3D shape priors to reduce the search space (i.e., imposing 3D object size limits to constrain the 2D classifier window size). Further, multiple objects can be detected and tracked. This is done by formulating cost functions that embody the multi-view constraints on position and shape of detected objects to resolve the inter-view object correspondence problem.

Figure 3:
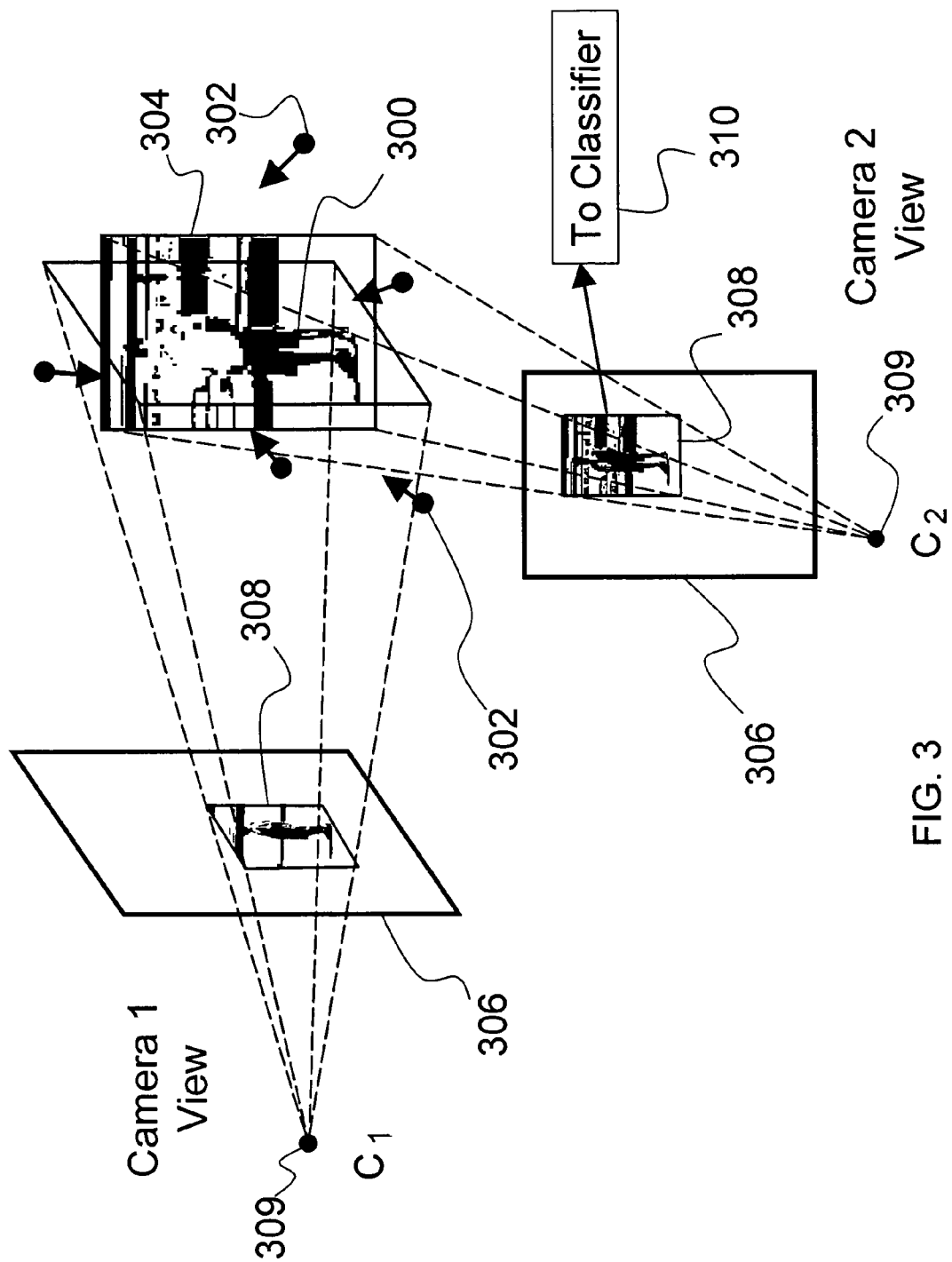
FIG. 3 is an illustration of Scheme 1 according to the present invention, where the classifier agents are particles in three-dimensional (3D) world space coordinates.
Figure 4:
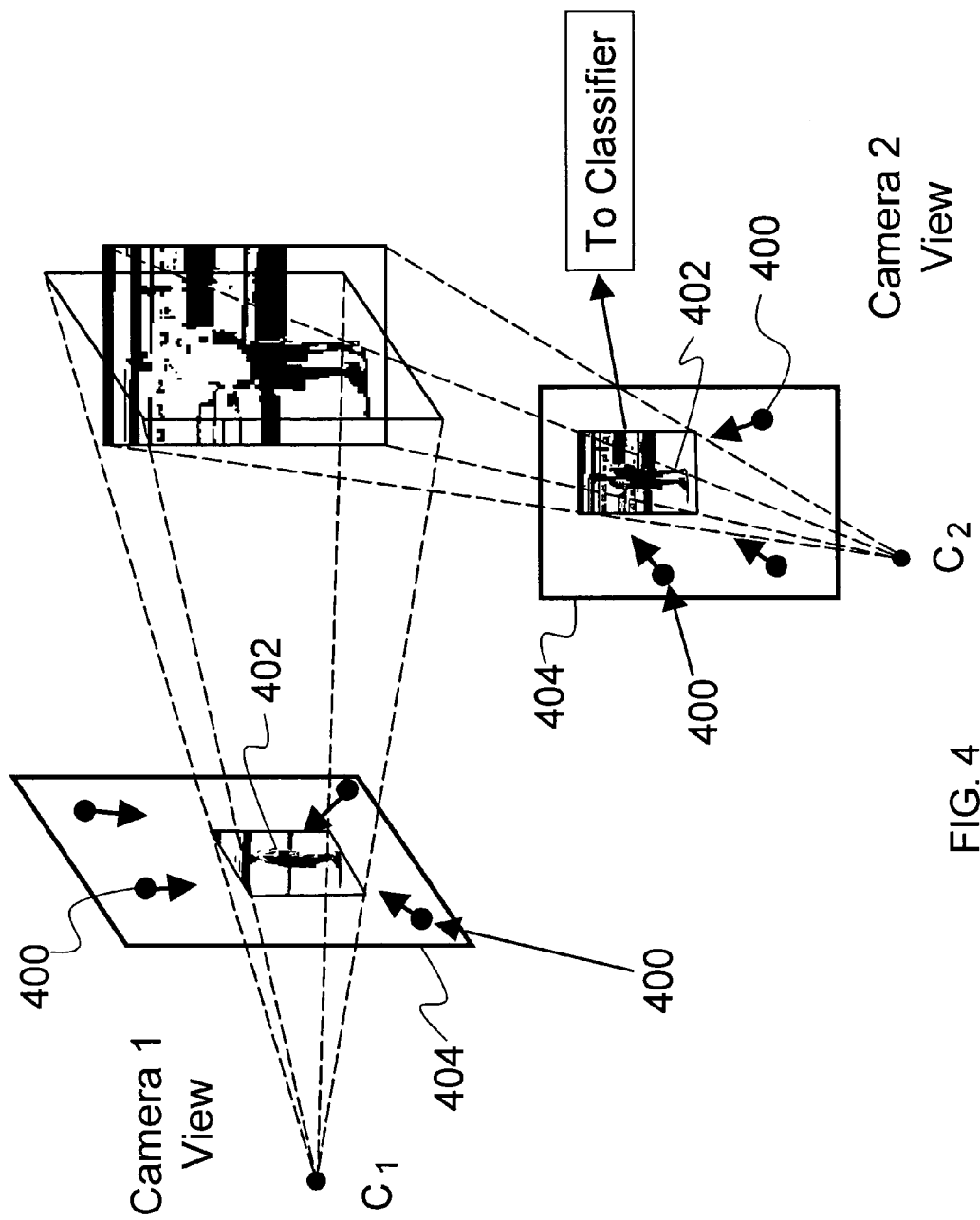
FIG. 4 is an illustration of Scheme 2 according to the present invention, where the classifier agents are particles in a two-dimensional (2D) image space for each view.

As illustrated in FIGS. 3 and 4, the cognitive swarm multi-view framework can be implemented using two distinct schemes. In Scheme 1, as illustrated by FIG. 3, distinct appearances of a 3D object 300 in widely different views are linked by classifier agents 302 (i.e., particles) searching for the object 300 in 3D spatial coordinates 304. The particles 302 can be calibrated using multiple views 306. Thus, in Scheme 1, the geometric link between the views 306 is imposed directly using the 3D search particles 302. The coordinates of each particle 302 represent its 3D position and object size. Given the known geometry of calibrated cameras 309, the 2D location of a particle's window projection 308 in each view 306 can be calculated. The windowed region 308 is then processed by the classifier.

It should be noted that the term "particle" as used herein refers to self-contained agents that classify local image windows and cooperate with other agents in finding objects in the scene. It should not be confused with particle filters which are completely different and are used for estimating probability distributions for tracking applications.

In Scheme 1, distinct appearances of a 3D object in different views 306 are linked by particles 302 searching for the object 300 in 3D space 304. Each particle has an associated 3D location X and an object height h (for an average pedestrian). Given the known geometry of calibrated cameras 309, the 2D location of a particle's projection in each view 306, $[x,y]^T=\pi(X)$, can be calculated and used to select the image windows that are sent to the classifier 310. As can be appreciated by one skilled in the art, superscript T denotes transpose. The cost function guiding the particle's search trajectory is formed by combining the classifier outputs evaluated at the particle's projection points in the two views 306. For a particle at $X=[x,y,z]^T$, the value of the cost function for Scheme 1 is given by:

$$f(X,h)=w_1*\text{classifier}(\text{image}_1,\pi_1(X),\Pi_1(X,h))+w_2*\text{classifier}(\text{image}_2,\pi_2(X),\Pi_2(X,h))$$

In the above function, $\pi: \mathbb{R}^3 \to \mathbb{R}^2$ is a projection operator such that $\pi_n$ maps the object's 3D location X into a 2D location $[x,y]$ in image n. Additionally, $w_1+w_2=1$, where $w_1$ and $w_2$ are positive weighting factors and normally $w_1=w_2=0.5$, and * denotes multiplication. Furthermore, $\Pi$ is a projection operator for object height, h, such that the projection operator $\Pi_n$ maps the 3D object height to its corresponding projection size in image n. Classifer denotes a confidence output of the object classifier operating on the window in image n with location $\pi_n(X)$ and window size $\Pi_n(X,h)$. The function classifier takes as input an image patch and returns as output a scalar (one dimensional) score that is some measure of the likelihood (confidence) that the image window contains a pedestrian. Image$_1$ and image$_2$ are the 2D images corresponding to the two different views of the same scene.

The cost function guiding the particle's search trajectory is formed by combining the classifier outputs evaluated at the particle's projection points in the two views. This concept was verified using synthetic cost functions; however, preliminary studies revealed problems with real classifier-based cost functions. Depending on the quality of object appearances, as measured by the classifier's ability to localize object windows in 2D, the 3D particles had difficulty converging on a stable minimum. Furthermore, in the case of convergence, localization was not always accurate. Scheme 2, however, proved much more stable and less sensitive to imprecision in object localization by the classifier.

In Scheme 2, as illustrated in FIG. 4, 2D particle 400 swarms attempt to localize an object 402 in each view 404 independently. Then, the 3D structure from the multiple views methods are used to establish the object's location in real-world coordinates. A cost/distance matrix is then formed for all possible inter-view pairs of identified object locations.

Figure 5:
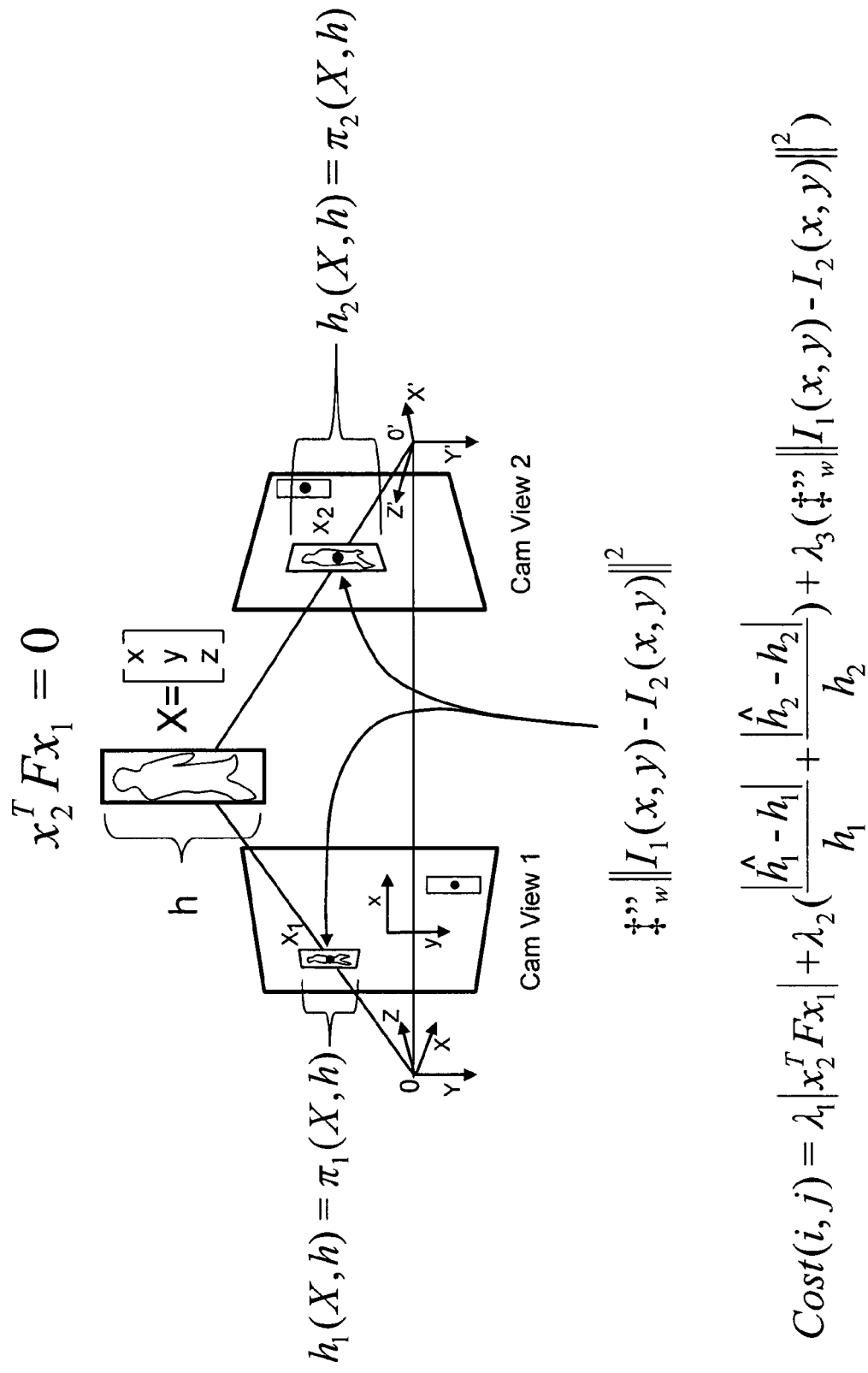
FIG. 5 is an illustration of multi-view geometric appearance constraints according to the present invention, embedded in a cost matrix for a correspondence resolution in Scheme 2.

As shown in FIG. 5, the pair-wise cost (Cost$_{ij}$) for Scheme 2 encapsulates the Epipolar constraint, the window size consistency measure, and the window-based appearance similarity measure. The pair-wise cost (Cost$_{ij}$) function is calculated as follows:

$$\text{Cost}(i,j) = \lambda_1 |x_2^T F x_1| + \lambda_2 \left( \frac{|\hat{h}_1 - h_1|}{h_1} + \frac{|\hat{h}_2 - h_2|}{h_2} \right) + \lambda_3 \left( \sum_w \|I_1(x,y) - I_2(x,y)\|^2 \right)$$

In the above function, Cost denotes a cost function, minimization of which ensures the consistent localization of an object in the 3D world coordinates. i and j denote point i in view 1 and point j in view 2 that correspond to detected objects in the two views. $\lambda_1$ denotes weighting factor for epipolar constraint portion of the cost function. $x_2$ denotes a coordinate vector for an object in view 2. F denotes the fundamental matrix that determines the epipolar lines in one view corresponding to points in the other view. $x_1$ denotes a coordinate vector for an object in view 1. The superscript T denotes a transpose of the vector $x_2$. $x_1$ is a column vector and F is a matrix, so $Fx_1$ is also a column vector. The transpose of $x_2$ is formed in order to form the inner product which results in a scalar. $\lambda_2$ denotes a weighting factor for the window size consistency portion of the cost function. $h_1$ denotes the size of an object in view 1 determined from projection of the object in 3D world coordinates to 2D view 1. $\tilde{h}$ denotes the size of the object in view 1 or 2 as determined from the object classifier response. $h_2$ denotes the size of an object in view 2 determined from projection of the object in 3D world coordinates to 2D view 2. $\lambda_3$ denotes a weighting factor for the window appearance similarity portion of the cost function. w denotes window index. || denotes a magnitude operator. $I_1$ denotes an intensity distribution of the window in view 1. x denotes an x coordinate in either view. y denotes a y coordinate in either view. $I_2$ denotes an intensity distribution of the window in view 2. Finally, $\sum$ denotes summation.

Optimal pairing (correspondence) between the inter-view points (point i in view 1 and point j in view 2) in this context can be posed as a bipartite weighted matching problem for which there are known working solutions. In this case, the problem was solved using the Hungarian algorithm. A Kalman smoothing filter was applied at the end to each object independently for optimal 3D trajectory estimation.

Using the present invention, two distinct scenarios are of interest (i.e., scenes with only a single object and scenes with multiple objects). For clarity, each of these scenarios will be described separately.

(4.2.1) Single Object

The 2D swarm search is performed to locate the object independently in each view. Geometric constraints are imposed to validate classification results. Geometric constraints also include 3D shape priors in this case. This step reduces false alarms and retains detection results for pairs satisfying the multi-view constraints. A Kalman smoothing filter is applied at the end for optimal 3D trajectory estimation. As an example, FIG. 6 illustrates single pedestrian 600 tracking, where 3D trajectories 602 and 602' correspond to two distinct camera views 604 and 604'. In FIG. 6, the bottom left illustration depicts 3D tracking of single pedestrian 600 from Camera 1 viewpoint 604, while the bottom right illustration depicts 3D tracking of the same pedestrian 900 from a Camera 2 viewpoint 604'. The two distinct camera views 604 and 604' were taken using two widely separated cameras mounted in a parking lot. In this example, the detection rate was 96% with no false alarms. Or alternatively, the epipolar score "Ep. score" in this example was 0.398. The Ep. Score is a measure of the degree to which the epipolar constraint is satisfied. The epipolar score is given by the first term in the expression for the cost.

(4.2.2) Multiple Objects

While the geometric constraints in the single object scenario are relatively straightforward to exploit, the framework cannot be transferred directly to the multiple object scenario. The correct pairings of objects between different views are required before a multi-view structure can be enforced. Therefore, geometric constraints are incorporated into a more complex graph matching problem. A 2D swarm search is performed to locate a given number of objects independently in each view. A cost/distance matrix is then formed for all possible inter-view pairs of identified object locations. Optimal pairing between the inter-view points is based on the cost matrix encapsulating both geometric and appearance constraints. The correspondence problem in this context can be posed as a bipartite weighted matching problem for which there are known working solutions. In this case, the problem can be solved using the Hungarian algorithm. The Kalman smoothing filter can then be applied to each object independently for optimal 3D trajectory estimation.

Several secondary developments supported the achievements of the present invention. Variations to particle swarm optimization were studied. In particular, multi-phase search algorithms were experimented with where the choice of search strategy was guided by the proximity to the object of interest (as detected by the classifier). Classifier-based localization was enhanced in the case of temporal sequences by incorporating Kalman filtering which proved extremely effective in combating classifier noise. Graph-matching techniques were incorporated for more advanced tasks involving multiple objects. Matching problems play a crucial part in translation of the "multi-view/single object" paradigms to "multi-view/multi-object" paradigms. Finally, known state of the art in-stereo camera calibration techniques were incorporated in this work to calibrate the cameras. Such techniques were described by Z. Zhang, in "A flexible new technique for camera calibration," IEEE Transactions on Pattern Analysis and Machine Intelligence, 22(11):1330-1334, 2000, and by Jean-Yves Bouguet, in "Camera Calibration Toolbox for Matlab®," which can be found at http://www.vision.caltech.edu/bougetj/calib_doc/, taken on Mar. 14, 2006. As can be appreciated by one skilled in the art, such camera calibration techniques are known and a further description herein of such techniques is not necessary to enable the present invention.

FIG. 7 illustrates exemplary multiple pedestrian tracking, where 3D trajectories 700 and 700' correspond to distinct pedestrians 702 and 702' as seen from the same camera. In other words, both the bottom left graph and the bottom right graph are 3D tracks 700 and 700' from the same camera viewpoint, but a different pedestrian's track is shown in the two bottom windows.

Localization and tracking results were verified by analyzing the 2D trajectory re-projection errors. The latest experiments indicated fairly accurate reconstruction of the actual 3D trajectories for the case of single and two pedestrian cases. Errors induced from noise in camera calibration parameters were kept to a sub-pixel range using camera calibration tools.

Figure 8:
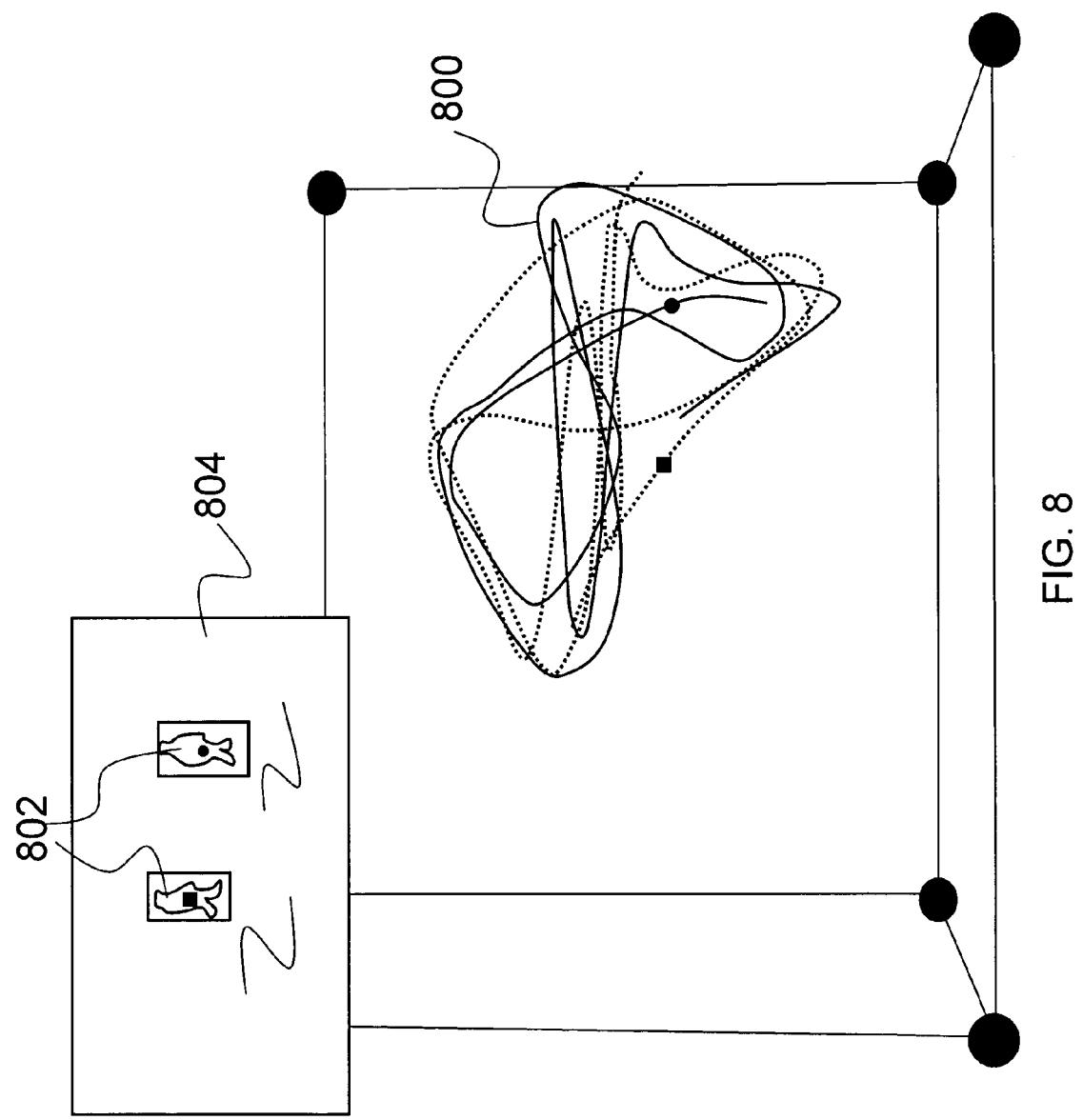
FIG. 8 is an illustration of estimated 3D trajectories for multiple pedestrians walking in an 18-meter by 18-meter area.
Figure 9:
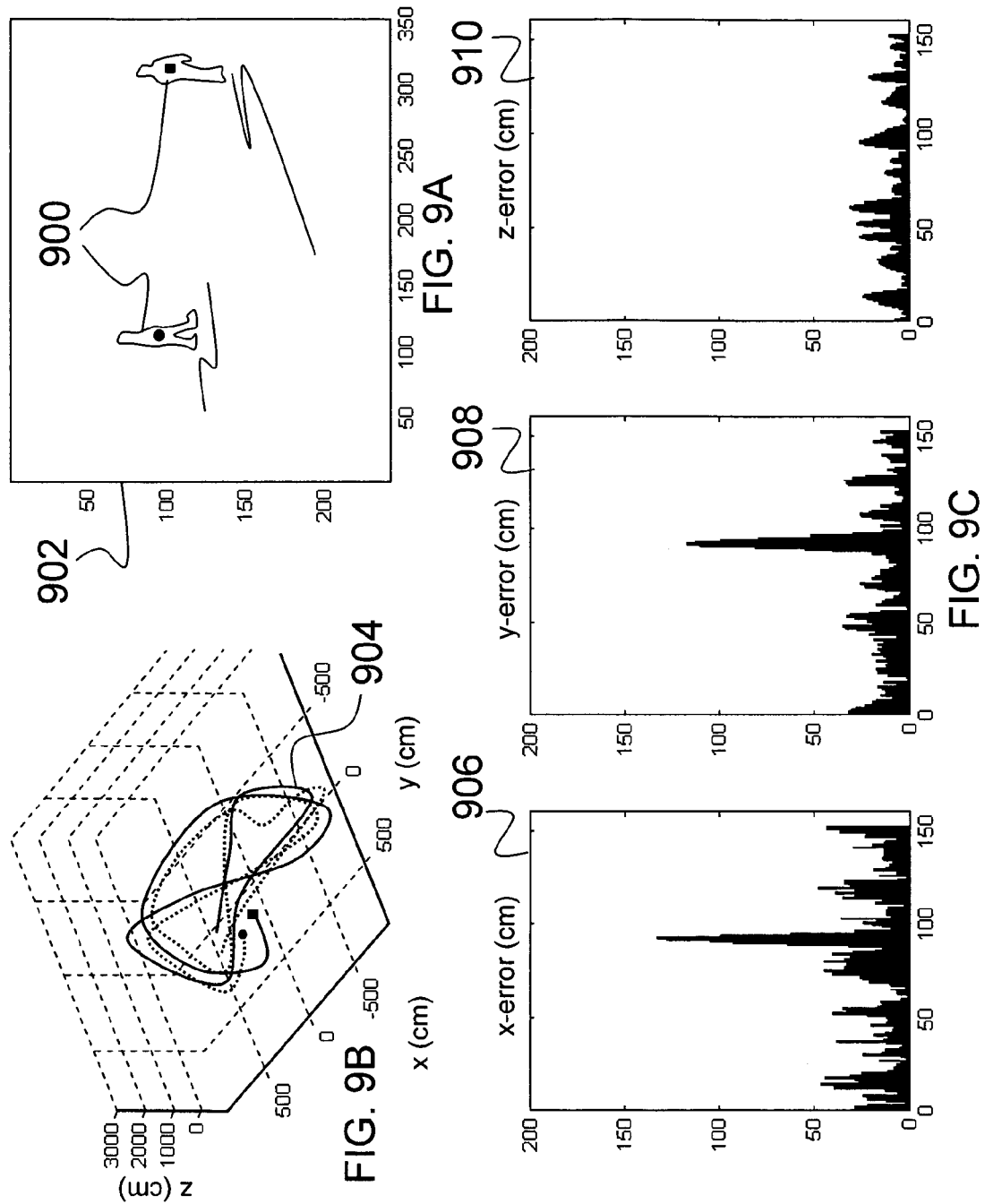
FIG. 9A is an illustration of multiple pedestrians walking in real-world coordinates.
FIG. 9B is an illustration of exemplary 3D trajectories of the pedestrians shown in FIG. 9A.
FIG. 9C is an illustration of exemplary 3D trajectory errors in real-world coordinates for one of the pedestrians shown in FIG. 9A.

Further exemplary object tracking is shown in FIGS. 8 and 9. FIG. 8 illustrates estimated 3D trajectories 800 for multiple pedestrians 802 walking in an 18 meter by 18 meter area 804. FIG. 9A illustrates multiple pedestrians 900 walking in real-world coordinates 902. FIG. 9B illustrates the 3D trajectories 904 of each the pedestrians 900. FIG. 9C illustrates exemplary 3D trajectory errors in real-world coordinates (x-axis 906, y-axis 908, and z-axis 910) for one of the pedestrians shown in FIG. 9A.

As shown in FIGS. 8 and 9, with the exception of a few correspondence misses, the tracking errors remained small relative to the object size, indicating successful tracking of multiple pedestrians in this 150 frame sequence with an error of about 25 cm over an 18 meter×18 meter area.

This is the first working system capable of fusing 2D image-based classifier outputs from multiple cameras to localize and track multiple pedestrians in 3D. The localization task includes the successful resolution of the object correspondence problem. The system is able to associate and correctly label objects across different views and time. While appearance similarity across views can play some role in correspondence resolution, as is done by other approaches, it is not necessary (in fact insufficient here) as alternate matching criterions are deployed to take advantage of the geometric structure that binds objects found in different image views.

(4.2.3) Object Recognition System Components

Figure 10:
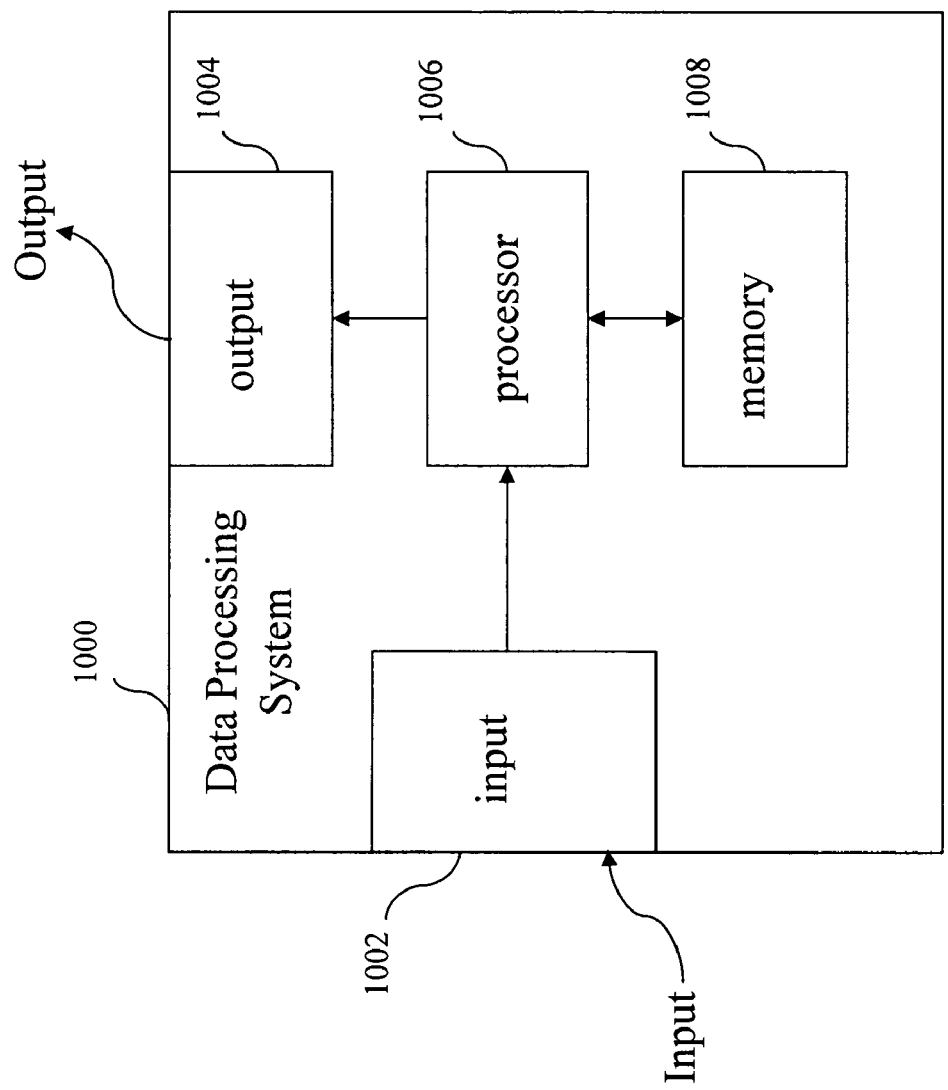
FIG. 10 is a component diagram depicting components of a data process system according to the present invention.

A block diagram depicting the components of object recognition system of the present invention is provided in FIG. 10. The object recognition system 1000 comprises an input 1002 for receiving information from at least one sensor for use in detecting image intensity in a scene. Note that the input 1002 may include multiple "ports." Typically, input is received from at least one sensor, non-limiting examples of which include video image sensors. An output 1004 is connected with the processor for providing information regarding the presence and/or identity of object(s) in the scene to other systems in order that a network of computer systems may serve as an image processing system. Output may also be provided to other devices or other programs; e.g., to other software modules, for use therein. The input 1002 and the output 1004 are both coupled with a processor 1006, which may be a general-purpose computer processor or a specialized processor designed specifically for use with the present invention. The processor 1006 is coupled with a memory 1008 to permit storage of data and software to be manipulated by commands to the processor.

(4.2.4) Computer Program Product

Figure 11:
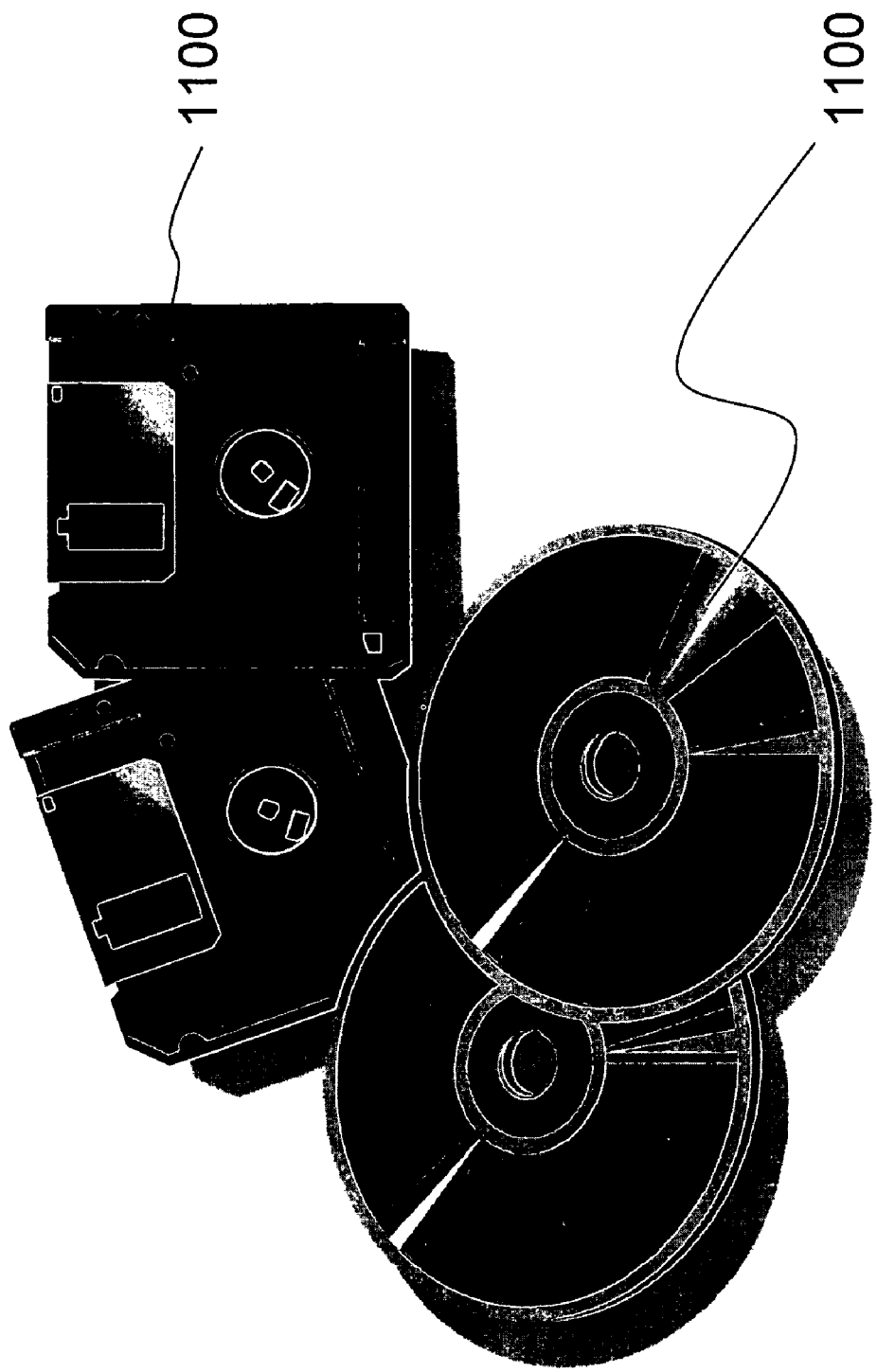
FIG. 11 illustrates a computer program product according to the present invention.

An illustrative diagram of a computer program product embodying the present invention is depicted in FIG. 11. The computer program product 1100 is depicted as an optical disk such as a CD or DVD. However, as mentioned previously, the computer program product generally represents computer-readable instructions stored on any compatible computer-readable medium.

What is claimed is:

1. A multi-view object recognition system incorporating swarming domain classifiers, comprising:

a processor having a plurality of software agents configured to operate as a cooperative swarm to classify an object in a domain as seen from multiple view points, where each agent is a complete classifier and is assigned an initial velocity vector to explore a solution space for object solutions, where each agent is configured to perform at least one iteration, the iteration being a search in the solution space for a potential solution optima where each agent keeps track of its coordinates in multi-dimensional space that are associated with an observed best solution (pbest) that the agent has identified, and a global best solution (gbest) where the gbest is used to store the best location among all agents, with each velocity vector thereafter changing towards pbest and gbest, allowing the cooperative swarm to concentrate on the vicinity of the object and classify the object when a classification level exceeds a preset threshold;

wherein the agents are configured to search for the object in three-dimensional (3D) spatial coordinates, such that the object is a 3D object and the 3D object has distinct appearances from each view point in the multiple view points; and wherein the distinct appearances of the 3D object from the multiple view points are linked by agents searching for the 3D object in the spatial coordinates, such that each agent has an associated 3D location X and an object height h, and wherein each of the multiple view points is provided as a 2D image from a calibrated camera having a given geometry, such that given the known geometry of the calibrated cameras, a 2D location, $[x,y]^T = \pi(X)$, of an agent's projection in each view (2D image) is calculated and used to select an image window that is sent to a classifier having a classifier output that corresponds to the classifier's confidence that the image window contains the object, where superscript T denotes transpose.

2. A multi-view object recognition system as set forth in claim 1, wherein each agent has a search trajectory that is guided by a cost function, such that the cost function is formed by combining the classifier outputs evaluated at the agent's projection points in each of the views, wherein the projection points are points in an image corresponding to the 3D object.

3. A multi-view object recognition system as set forth in claim 2, wherein for an agent at 3D location $X=[x,y,z]^T$, a value of the cost function is calculated according to the following:

$$f(X,h) = w_1 * \text{classifier}(\text{image}_1, \pi_1(X), \Pi_1(X,h)) + w_2 * \text{classifier}(\text{image}_2, \pi_2(X), \Pi_2(X,h)),$$

where, $\pi: \mathbb{R}^3 \rightarrow \mathbb{R}^2$ is a projection operator such that $\pi_n$ maps the object's 3D location X into a 2D location [x,y] in image n, and $w_1 + w_2 = 1$, where $w_1$ and $w_2$ are positive weighting factors and normally $w_1 = w_2 = 0.5$, and where $\Pi$ is a projection operator for object height, h, such that the projection operator $\Pi_n$ maps the 3D object height to its corresponding projection size in image n, and where classifer denotes a confidence output of the object classifier operating on the window in image n with location $\pi_n(X)$ and window size $\Pi_n(X,h)$, and where * denotes multiplication.

4. A multi-view object recognition system as set forth in claim 1, wherein each of the multiple view points is provided as a 2D image from calibrated stereo cameras, and wherein the multiple view points include at least two 2D views, view 1 and view 2, and wherein the agents are configured to move within each view independently to localize the object in each view independently, and wherein each view has 2D spatial coordinates.

5. A multi-view object recognition system as set forth in claim 4, wherein the object is a 3D object having 3D spatial coordinates, and wherein the 3D object has a 2D projection in each view in the multiple view points such that the object has a distinct appearance in each view, and wherein the agents are configured to search for the object in the 2D spatial coordinates.

6. A multi-view object recognition system as set forth in claim 5, wherein each of the 2D views is connected through geometric constraints of the calibrated stereo cameras, and wherein the agents are further configured to operate as two distinct sets of agents such that each set searches for the object in a view independently to locate a 2D location [x,y] and a 2D image window height ĥ of the object in each view, and wherein using triangulation, the 2D locations from each view are combined to estimate the object's 3D spatial coordinates from the 2D projections.

7. A multi-view object recognition system as set forth in claim 6, wherein the system is further configured to recognize multiple objects in the domain, such that when there is more than one object in the domain, the system is further configured to establish a correspondence between the 2D locations found in each 2D view to identify inter-view pairs.

8. A multi-view object recognition system as set forth in claim 7, wherein when establishing a correspondence between the 2D locations found in each 2D view, the system is further configured to form a cost/distance matrix for all possible inter-view pairs of identified object locations, the cost/distance matrix is a pair-wise cost ($\text{Cost}_{ij}$) function, calculated as follows:

$$Cost(i, j) =$$

$$\lambda_1 |x_2^T F x_1| + \lambda_2 \left( \frac{|\hat{h}_1 - h_1|}{h_1} + \frac{|\hat{h}_2 - h_2|}{h_2} \right) + \lambda_3 (\Sigma_w \| I_1(x, y) - I_2(x, y) \|^2),$$

where Cost denotes a cost function, minimization of which ensures a consistent localization of an object in the 3D spatial coordinates;

i and j denote point i in view 1 and point j in view 2 that correspond to detected objects in the two views; $\lambda_1$ denotes weighting factor for an epipolar constraint portion of the cost function;

$\lambda_1$ denotes weighting factor for an epipolar constraint portion of the cost function;

$x_2$ denotes a coordinate vector for an object in view 2;

F denotes a fundamental matrix that determines epipolar lines in one view corresponding to points in the other view;

$x_1$ denotes a coordinate vector for an object in view 1;

superscript T denotes a transpose of the vector $x_2$;

wherein $x_1$ is a column vector and F is a matrix, so $Fx_1$ is also a column vector;

$\lambda_2$ denotes a weighting factor for a window size consistency portion of the cost function;

$h_1$ denotes a size of the object in view 1 determined from the 2D projection of the object in 3D spatial coordinates to 2D view 1;

$\hat{h}$ denotes the size of the object in view 1 or 2 as determined from the object classifier outputs;

$h_2$ denotes the size of an object in view 2 determined from the 2D projection of the object in 3D spatial coordinates to the 2D view 2;

$\lambda_3$ denotes a weighting factor for a window appearance similarity portion of the cost function;

w denotes window index;

$\|$ denotes a magnitude operator;

$I_1$ denotes an intensity distribution of the window in view 1;

x denotes an x coordinate in either view;

y denotes a y coordinate in either view;

$I_2$ denotes an intensity distribution of the window in view 2; and $\Sigma$ denotes summation.

9. A multi-view object recognition system as set forth in claim 8, wherein the system is further configured to optimize pairing between the inter-view points (point i in view 1 and point j in view 2) using a bipartite weighted matching problem, and further comprising a smoothing filter for optimal 3D trajectory estimation.

10. A multi-view object recognition system as set forth in claim 9, wherein the object is further configured to track multiple objects.

11. A computer implemented method for multi-view object recognition using swarming domain classifiers, the method comprising acts of:

configuring a plurality of software agents (i.e., particles) to operate as a cooperative swarm to classify an object in a domain as seen from multiple view points, where each agent is a complete classifier and is assigned an initial velocity vector to explore a solution space for object solutions;

configuring each agent to perform at least one iteration, the iteration being a search in the solution space for a potential solution optimum where each agent keeps track of its coordinates in multi-dimensional space that are associated with an observed best solution (pbest) that the agent has identified, and a global best solution (gbest) where the gbest is used to store the best location among all agents, with each velocity vector thereafter changing towards pbest and gbest, allowing the cooperative swarm to concentrate on the vicinity of the object and classify the object when a classification level exceeds a preset threshold;

further comprising an act of configuring the agents to search for the object in three-dimensional (3D) spatial coordinates, such that the object is a 3D object and the 3D object has distinct appearances from each view point in the multiple view points; and further comprising an act of linking the agents such that the distinct appearances of the 3D object from the multiple view points are linked by agents searching for the 3D object in the spatial coordinates, such that each agent has an associated 3D location X and an object height h, and wherein each of the multiple view points is provided as a 2D image from a calibrated camera having a given geometry, such that given the known geometry of the calibrated cameras, a 2D location, $[x,y]^T = \pi(X)$, of an agent's projection in each view (2D image) is calculated and used to select an image window that is sent to a classifier having a classifier output that corresponds to the classifier's confidence that the image window contains the object, where superscript T denotes transpose.

12. A method as set forth in claim 11, further comprising an act of configuring each agent to have a search trajectory that is guided by a cost function, such that the cost function is formed by combining the classifier outputs evaluated at the agent's projection points in each of the views, wherein the projection points are points in an image corresponding to the 3D object.

13. A method as set forth in claim 12, further comprising an act of calculating a cost function for an agent at 3D location $X=[x,y,z]^T$, according to the following:

$$f(X,h) = w_1 * \text{classifier}(\text{image}_1, \pi_1(X), \Pi_1(X,h)) + w_2 * \text{classifier}(\text{image}_2, \pi_2(X), \Pi_2(X,h)),$$

where, $\pi: \mathbb{R}^3 \to \mathbb{R}^2$ is a projection operator such that $\pi_n$ maps the object's 3D location X into a 2D location [x,y] in image n, and $w_1 + w_2 = 1$, where $w_1$ and $w_2$ are positive weighting factors and normally $w_1 = w_2 = 0.5$, and where $\Pi$ is a projection operator for object height, h, such that the projection operator $\Pi_n$ maps the 3D object height to its corresponding projection size in image n, and where classifer denotes a confidence output of the object classifier operating on the window in image n with location $\pi_n(X)$ and window size $\Pi_n(X,h)$, and where * denotes multiplication.

14. A method as set forth in claim 11, further comprising acts of:

receiving each of the multiple view points as a 2D image from calibrated stereo cameras, and wherein the multiple view points include at least two 2D views, view 1 and view 2, wherein each view has 2D spatial coordinates; and configuring the agents to move within each view independently to localize the object in each view independently.

15. A method as set forth in claim 14, further comprising acts of:

forming a 2D projection of a 3D object having 3D spatial coordinates, such that the 3D object has a 2D projection in each view in the multiple view points such that the object has a distinct appearance in each view; and configuring the agents to search for the object in the 2D spatial coordinates.

16. A method as set forth in claim 15, further comprising acts of:
configuring the agents to operate as two distinct sets of agents such that each set searches for the object in a view independently to locate a 2D location [x,y] and a 2D image window height ĥ of the object in each view; and
using triangulation to combine the 2D locations from each view to estimate the object's 3D spatial coordinates from the 2D projections.

17. A method as set forth in claim 16, further comprising an act of establishing a correspondence between the 2D locations found in each 2D view to identify inter-view pairs.

18. A method as set forth in claim 17, wherein the act of establishing a correspondence, further comprises an act of forming a cost/distance matrix for all possible inter-view pairs of identified object locations, the cost/distance matrix being a pair-wise cost ($Cost_{ij}$) function, calculated as follows:

$$\text{Cost}(i, j) = \lambda_1 |x_2^T F x_1| + \lambda_2 \left( \frac{|\hat{h}_1 - h_1|}{h_1} + \frac{|\hat{h}_2 - h_2|}{h_2} \right) + \lambda_3 \left( \sum_w \|I_1(x, y) - I_2(x, y)\|^2 \right)$$

where Cost denotes a cost function, minimization of which ensures a consistent localization of an object in the 3D spatial coordinates;
i and j denote point i in view 1 and point j in view 2 that correspond to detected objects in the two views;
$\lambda_1$ denotes weighting factor for an epipolar constraint portion of the cost function;
$x_2$ denotes a coordinate vector for an object in view 2;
F denotes a fundamental matrix that determines epipolar lines in one view corresponding to points in the other view;
$x_1$ denotes a coordinate vector for an object in view 1;
superscript T denotes a transpose of the vector $x_2$;
wherein $x_1$ is a column vector and F is a matrix, so $Fx_1$ is also a column vector;
$\lambda_2$ denotes a weighting factor for a window size consistency portion of the cost function;
$h_1$ denotes a size of the object in view 1 determined from the 2D projection of the object in 3D spatial coordinates to 2D view 1;
ĥ denotes the size of the object in view 1 or 2 as determined from the object classifier outputs;
$h_2$ denotes the size of an object in view 2 determined from the 2D projection of the object in 3D spatial coordinates to the 2D view 2;
$\lambda_3$ denotes a weighting factor for a window appearance similarity portion of the cost function;
w denotes window index;
‖ denotes a magnitude operator;
$I_1$ denotes an intensity distribution of the window in view 1;
x denotes an x coordinate in either view;
y denotes a y coordinate in either view;
$I_2$ denotes an intensity distribution of the window in view 2; and
Σ denotes summation.

19. A method as set forth in claim 18, further comprising acts of:
optimizing pairing between the inter-view points (point i in view 1 and point j in view 2) using a bipartite weighted matching problem; and
estimating a 3D trajectory of at least one 3D object.

20. A method as set forth in claim 19, further comprising an act of tracking multiple objects.

21. A computer program product for object recognition, the computer program product comprising computer-readable instruction means encoded on a computer-readable medium and executable by a computer for causing a computer to:
configure a plurality of software agents (i.e., particles) to operate as a cooperative swarm to classify an object in a domain as seen from multiple view points, where each agent is a complete classifier and is assigned an initial velocity vector to explore a solution space for object solutions, where each agent is configured to perform at least one iteration, the iteration being a search in the solution space for a potential solution optima where each agent keeps track of its coordinates in multi-dimensional space that are associated with an observed best solution (pbest) that the agent has identified, and a global best solution (gbest) where the gbest is used to store the best location among all agents, with each velocity vector thereafter changing towards pbest and gbest, allowing the cooperative swarm to concentrate on the vicinity of the object and classify the object when a classification level exceeds a preset threshold;
further comprising instruction means to cause a computer to perform an operation of utilizing the agents to search for the object in three-dimensional (3D) spatial coordinates, such that the object is a 3D object and the 3D object has distinct appearances from each view point in the multiple view points; and
further comprising instruction means to cause a computer to perform an operation of linking the agents such that the distinct appearances of the 3D object from the multiple view points are linked by agents searching for the 3D object in the spatial coordinates, such that each agent has an associated 3D location X and an object height h, and wherein each of the multiple view points is provided as a 2D image from a calibrated camera having a given geometry, such that given the known geometry of the calibrated cameras, a 2D location, $[x,y]^T = \pi(X)$, of an agent's projection in each view (2D image) is calculated and used to select an image window that is sent to a classifier having a classifier output that corresponds to the classifier's confidence that the image window contains the object, where superscript T denotes transpose.

22. A computer program product as set forth in claim 21, further comprising instruction means to cause a computer to perform an operation of configuring each agent to have a search trajectory that is guided by a cost function, such that the cost function is formed by combining the classifier outputs evaluated at the agent's projection points in each of the views, wherein the projection points are points in an image corresponding to the 3D object.

23. A computer program product as set forth in claim 22, further comprising instruction means to cause a computer to perform an operation of calculating a cost function for an agent at 3D location $X = [x,y,z]^T$, according to the following:

$$f(X,h) = w_1 * \text{classifier}(\text{image}_1, \pi_1(X), \Pi_1(X,h)) + w_2 * \text{classifier}(\text{image}_2, \pi_2(X), \Pi_2(X,h)),$$

where, $\pi: \mathbb{R}^3 \rightarrow \mathbb{R}^2$ is a projection operator such that $\pi_n$ maps the object's 3D location X into a 2D location [x,y] in image n, and $w_1 + w_2 = 1$, where $w_1$ and $w_2$ are positive weighting factors and normally $w_1 = w_2 = 0.5$, and where Π is a projection operator for object height, h, such that the projection operator $\Pi_n$ maps the 3D object height to its corresponding projection size in image n, and where classifer denotes a confidence output of the object classifier operating on the window in image n with location $\pi_n(X)$ and window size $\Pi_n(X,h)$, and where * denotes multiplication.

24. A computer program product as set forth in claim 21, further comprising instruction means for causing a computer to perform operations of:
  receive each of the multiple view points as a 2D image from calibrated stereo cameras, and wherein the multiple view points include at least two 2D views, view 1 and view 2, wherein each view has 2D spatial coordinates; and
  configure the agents to move within each view independently to localize the object in each view independently.

25. A computer program product as set forth in claim 24, further comprising instruction means to cause a computer to perform operations of:
  forming a 2D projection of a 3D object having 3D spatial coordinates, such that the 3D object has a 2D projection in each view in the multiple view points such that the object has a distinct appearance in each view; and
  configuring the agents to search for the object in the 2D spatial coordinates.

26. A computer program product as set forth in claim 25, further comprising instruction means to cause a computer to perform operations of:
  configuring the agents to operate as two distinct sets of agents such that each set searches for the object in a view independently to locate a 2D location [x,y] and a 2D image window height ĥ of the object in each view; and
  using triangulation to combine the 2D locations from each view to estimate the object's 3D spatial coordinates from the 2D projections.

27. A computer program product as set forth in claim 26, further comprising instruction means to cause a computer to perform an operation of establishing a correspondence between the 2D locations found in each 2D view to identify inter-view pairs.

28. A computer program product as set forth in claim 27, further comprising instruction means to cause a computer to perform an operation of forming a cost/distance matrix for all possible inter-view pairs of identified object locations, the cost/distance matrix being a pair-wise cost ($Cost_{ij}$) function, calculated as follows:

$$Cost(i,j) = \lambda_1 |x_2^T F x_1| + \lambda_2 \left( \frac{|\hat{h}_1 - h_1|}{h_1} + \frac{|\hat{h}_2 - h_2|}{h_2} \right) + \lambda_3 \left( \sum_w \|I_1(x,y) - I_2(x,y)\|^2 \right)$$

where Cost denotes a cost function, minimization of which ensures a consistent localization of an object in the 3D spatial coordinates;

i and j denote point i in view 1 and point j in view 2 that correspond to detected objects in the two views;

$\lambda_1$ denotes weighting factor for an epipolar constraint portion of the cost function;

$x_2$ denotes a coordinate vector for an object in view 2;

F denotes a fundamental matrix that determines epipolar lines in one view corresponding to points in the other view;

$x_1$ denotes a coordinate vector for an object in view 1;

superscript T denotes a transpose of the vector $x_2$;

wherein $x_1$ is a column vector and F is a matrix, so $Fx_1$ is also a column vector;

$\lambda_2$ denotes a weighting factor for a window size consistency portion of the cost function;

$h_1$ denotes a size of the object in view 1 determined from the 2D projection of the object in 3D spatial coordinates to 2D view 1;

ĥ denotes the size of the object in view 1 or 2 as determined from the object classifier outputs;

$h_2$ denotes the size of an object in view 2 determined from the 2D projection of the object in 3D spatial coordinates to the 2D view 2;

$\lambda_3$ denotes a weighting factor for a window appearance similarity portion of the cost function;

w denotes window index;

|| denotes a magnitude operator;

$I_1$ denotes an intensity distribution of the window in view 1;

x denotes an x coordinate in either view;

y denotes a y coordinate in either view;

$I_2$ denotes an intensity distribution of the window in view 2; and

Σ denotes summation.

29. A computer program product as set forth in claim 28, further instruction means to cause a computer to perform operations:
  optimizing pairing between the inter-view points (point i in view 1 and point j in view 2) using a bipartite weighted matching problem; and
  estimating a 3D trajectory of at least one 3D object.

30. A computer program product as set forth in claim 29, further comprising instruction means to cause a computer to perform an operation of tracking multiple objects.

* * * * *